March 6, 1928.
S. M. FAIRCHILD
AERIAL CAMERA
Filed March 1, 1923
1,661,364
3 Sheets-Sheet 1
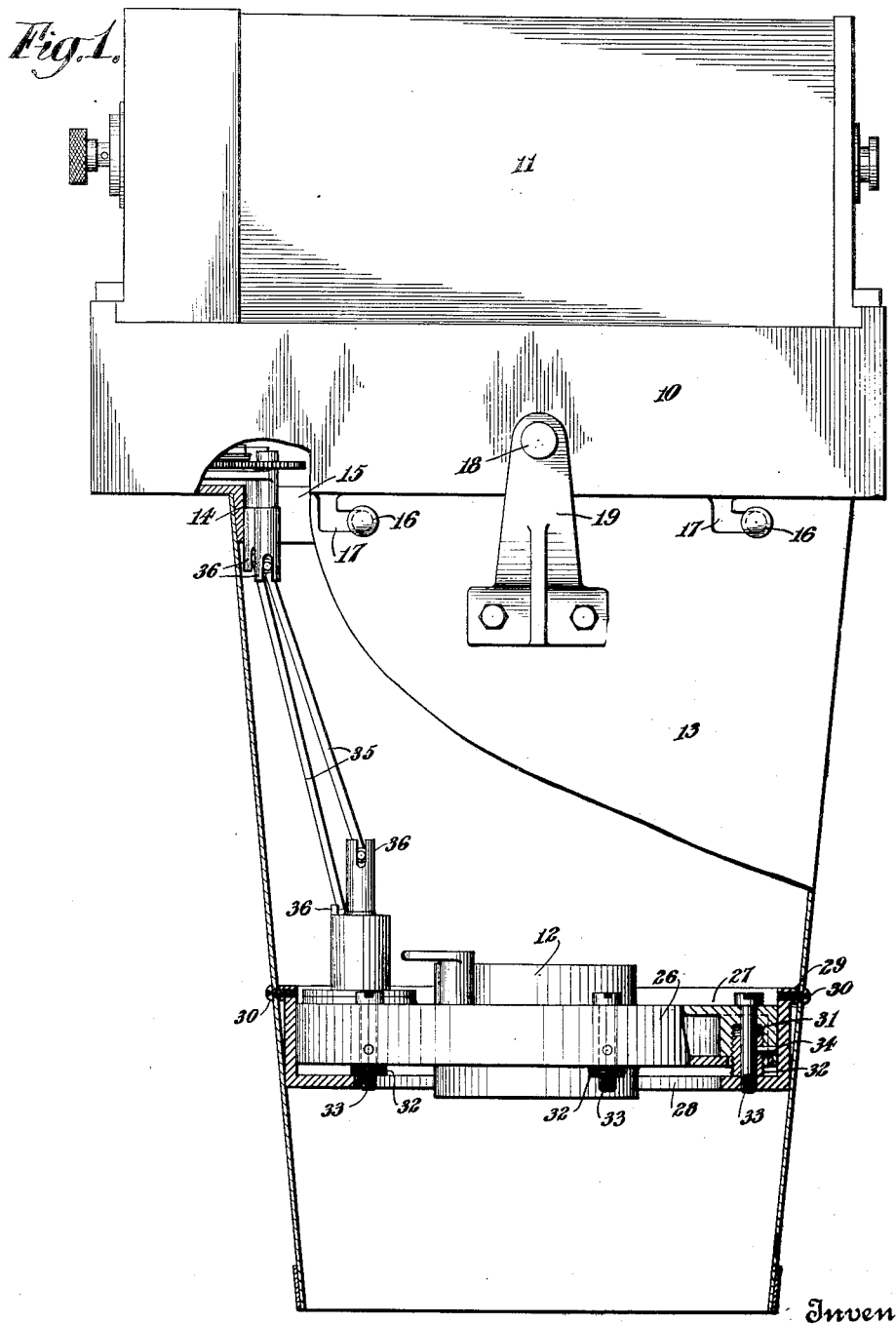

March 6, 1928.
S. M. FAIRCHILD
AERIAL CAMERA
Filed March 1, 1923
1,661,364
3 Sheets-Sheet 2
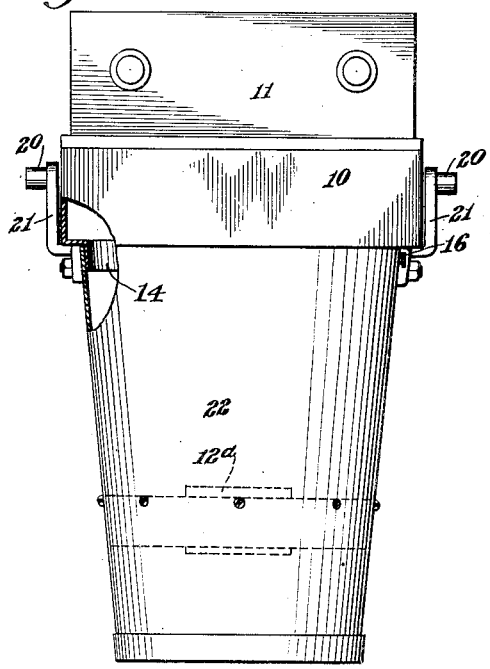
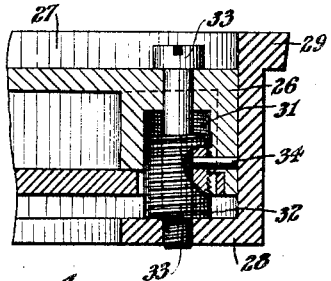
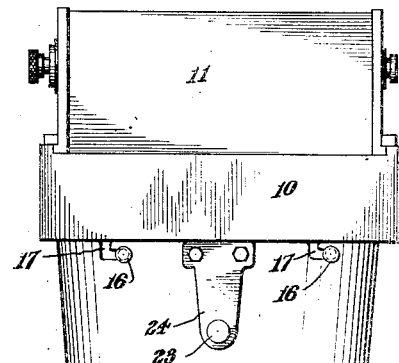
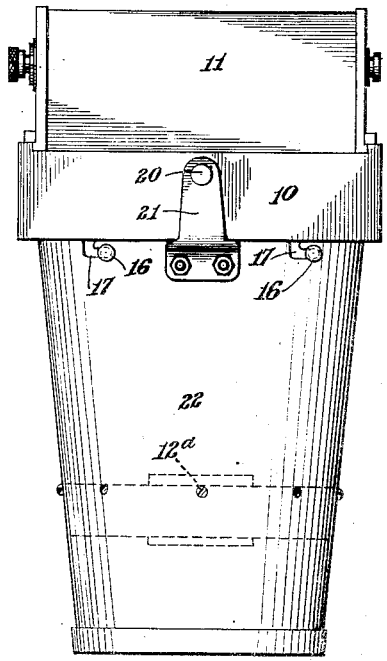
Inventor
S. M. Fairchild
By his Attorneys
Cooper, Kerr & Dunham March 6, 1928.
S. M. FAIRCHILD
AERIAL CAMERA
Filed March 1, 1923
1,661,364
3 Sheets-Sheet 3
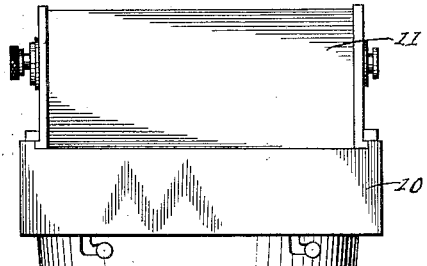
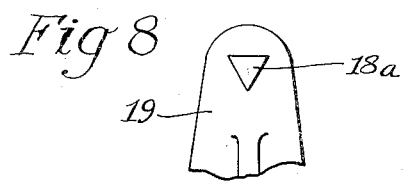
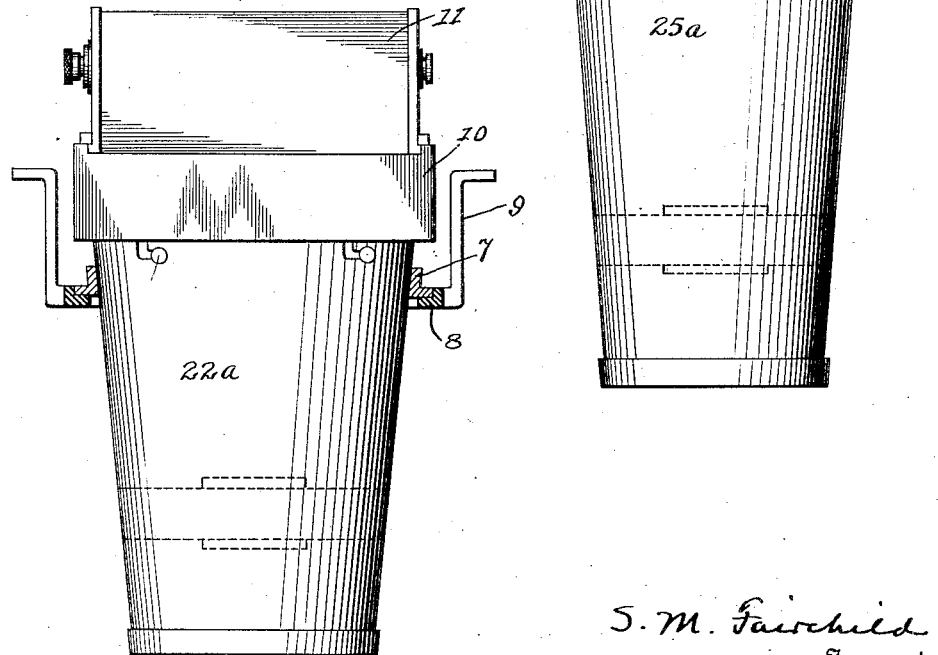
S. M. Fairchild
Inventor
By his Attorneys
Cooper, Kerr & Dunham

UNITED STATES PATENT OFFICE.

SHERMAN M. FAIRCHILD, OF NEW YORK, N. Y.

AERIAL CAMERA.

Application filed March 1, 1923. Serial No. 622,034.

This invention relates to cameras, particularly cameras for aerial photography, in which the lens is carried by a tubular member, commonly known as the lens "cone", extending from the front or, in aerial cameras usually from the bottom of the camera body. More especially the invention relates to the mounting of the cone on the camera, and its chief object is to provide a method of mounting which will permit a plurality of cones, for lenses of different focal lengths, to be used interchangeably. Cameras for aerial photography are commonly supported in universal mounts, so that as the airplane tilts in flight the camera can swing and thereby maintain its optical axis in a substantially constant position with reference to the ground or other object or can, within certain limits imposed by the nature of the mounting, be trained on the object to be photographed. In such cases the camera is supported pivotally, and it is usually desirable to have the axis or axes, on which it swings, in or close to the center of gravity of the apparatus. Accordingly another object of this invention is to provide the lens cone or cones with pivotal means by which the axis of swing is brought to the desired position with respect to the center of gravity. Still another object is to provide a lens cone and lens mounting which will permit various lenses of nominally the same or nearly the same focal length to be used interchangeably without adjustment for focus when the change is made. To these and other ends the invention consists in the novel features hereinafter described.

A convenient and effective embodiment of the invention is illustrated in the accompanying drawings, in which Fig. 1 is a side view, partly in section, showing an aerial camera equipped with my lens cone, lens mount, and camera-supporting means.

Figs. 2 and 3 are side views, at right angles to each other, showing a cone (for a lens of shorter focal length) which is interchangeable with that shown in Fig. 1 without substantial change in the position of the axis of the camera pivots with respect to the center of gravity.

Fig. 4 is a side view of a longer lens cone which is interchangeable with those of Figs. 1 and 2 in the same way.

Fig. 5 is a detail sectional view of the means for securing the lens in the cone.

Figs. 6 and 7 are side views illustrating a modified form of camera supporting means.

Fig. 8 is a detail view illustrating another modification.

The camera body is represented at 10, and is equipped with a removable magazine 11 for the sensitive plates or film. The nature of the magazine or other means for supporting the plate or film in position for exposure is immaterial.

The lens 12 is mounted in a tubular carrier or "cone" 13, detachably mounted on the underside of the camera. For this purpose the camera is provided with a suitable fitting, as a flange or collar 14, around the opening 15, over which the upper end of the cone fits snugly so as to make a light-tight joint. The cone is releasably secured in place by bayonet studs 16 cooperating with bayonet slots 17 so that it can be removed and replaced or another cone, of the same size and construction at the base, can be substituted, whenever desired.

As previously stated, aerial cameras are usually supported in a universal mount, preferably one of the gimbal type, in which case the camera is itself provided with pivots, or with bearings for pivots, on opposite sides. It is also desirable in such cases to have the axis of these pivots pass through or close to the center of gravity of the camera, and the practise heretofore has been to mount the pivots on the camera body. It will be seen, however, that if a lens of different focal length or different aperture be used, the position of the center of gravity will be altered, since the new lens will be nearer or farther from the exposure plane, or of different weight, or both. This means that the balance of the camera will be disturbed unless the pivots are shifted. In my present invention the difficulty is overcome in a very simple but effective manner. For this purpose I mount the camera pivots not on the camera body but on the lens cone, and locate them in such position that their axis will have the desired proximity to the center of gravity of the apparatus when the lens is in place. In Fig. 1 one of the pivots is shown at 18. It is carried by an arm 19 which is fixed on the side of the lens cone and extends upwardly so as to bring the pivot to the plane of the center of gravity. The other pivot, not shown in Fig. 1, is similarly located on the opposite side of the cone, and both are spaced out from the camera body 10 to permit the slight rotation of the cone required to disengage the same from the bayonet studs. A lens of shorter focal length must be nearer to the plate or film. The center of gravity is thus raised, and accordingly higher pivot arms are used, as shown for example in Figs. 2 and 3, in which the pivots or journals 20, carried by the arms 21 on the cone 22, are seen to be relatively higher than the pivot 18 on the cone 13, Fig. 1. The cones mentioned may be of the same or different lengths, according to the position of the lenses in the respective cones, as will be readily understood. Thus if the shorter focal length lens shown in dotted lines at $12^a$ is mounted in the cone at the same distance above the lower end as is the lens 12 in Fig. 1, the cone 22 must, to permit its use on the same camera, be proportionately shorter. On the other hand, a lens of greater focal length may so lower the center of gravity as to require the pivot arms to extend downwardly, as in Fig. 4, for example, in which the pivot or journal 23 is shown carried by a depending arm 24 mounted on the long cone 25 carrying the lens $12^b$. Whatever the taper and length of the cone, the upper end thereof should be shaped to fit the collar 14 with the desired snugness.

For some purposes it is not necessary to have the camera pivotally mounted, but it should, nevertheless, be so arranged that its center of gravity is in or near the plane in which the camera is supported. In such cases a form of support such as illustrated in Figs. 6 and 7 may be used with advantage. As there shown each of the lens cones $22^a$ and $25^a$ is provided with an outwardly flanged positioning ring 7 fixed thereon, removably seated in the camera support, which is represented by the rabbeted annulus 8 rigidly suspended by arms 9 from any suitable mounting means, not shown. Or the parts 18, 20, 23, shown as pivots in Figs. 1, 2, 3 and 4, can be angular studs, as $18^a$ in Fig. 8, to fit into similarly shaped recesses in the camera support, not shown.

Lenses of different focal length may be permanently mounted in their respective cones, and can then be used interchangeably on the same camera without the necessity of focusing when the lens and cone are changed. This method is not always convenient, for it is sometimes desirable, and in fact sometimes necessary, as in case of breakage of a lens, or derangement of the lens-shutter, for example, to substitute another lens of the same focal length, in the same cone. However, lenses which have nominally the same focus are often different in that respect, by an amount sufficient to affect the definition on the plate. The substituted lens would therefore have to be focussed, which might be inconvenient or impracticable in the field. Accordingly I prefer to employ a type of lens mount which will obviate the necessity of focussing in the field. A convenient construction for this purpose is illustrated in Figs. 1 and 5. In this construction the lens 12 is fitted to a carrier 26, which may be, and preferably is, a shutter, fitted snugly but smoothly in an annular support 27 mounted inside of the cone 13 at approximately the correct position for the lens. This support in the form shown has at its bottom an inwardly extending flange 28 to support the shutter 26, and at its top an outwardly extending flange 29 to receive the screws 30 by which the whole is removably secured in the cone. The shutter or carrier 26 is provided with a plurality of downwardly internally threaded open apertures or sockets, as 31, containing threaded adjusting plugs or stops 32 the lower ends of which rest on the flange 28. When the lenses usable with the given cone and support are assembled in their shutters, each is set down in place and the stops 32 are screwed in or out, as the case may be, until the image of a distant object, for example an object at the hyperfocal distance, is sharp on the focussing screen. This adjustment can be conveniently effected by means of a suitable wrench or other tool, not shown, inserted through the exposure opening provided in the flange 28. The lens and shutter assembly is then removed and holes are drilled through the sides of the shutter and into the adjusting stops, to receive the tightly fitting pins 34, which serve to prevent accidental displacement of the stops and consequent impairment of the adjustment. Any lens thus "focussed" can now be removed and replaced as often as desired with the assurance that when the screws 33 are set up it will be in accurate focus for all objects within the range for which it was originally focussed. The shutter illustrated is set and tripped from the camera body 10 by means of shafts 35, detachably connected to the universal joints 36. As the lens cone is positioned on the camera the shafts are guided into engagement with the appropriate universal joints by the operator's hand inserted into the cone from above, the plate or film carrier or magazine 11 being of course removed.

It is to be understood that the invention is not confined to the construction herein specifically illustrated and described but can be embodied in other forms without departure from its spirit. Nor are all the features of the invention limited to use in aerial photography.

I claim:

1. In a photographic apparatus, a camera, a detachable lens cone therefor, and means carried by the lens cone for pivotally supporting the camera to permit swinging movement of the latter on an axis having a predetermined position relative to the center of gravity of the apparatus.

2. In a photographic apparatus, a camera, a detachable lens cone provided with means for releasably locking it on the camera, and having means for pivotally supporting the camera to swing on an axis located in a predetermined position relative to the center of gravity of the apparatus.

3. In a photographic apparatus, a camera, a detachable lens cone therefor, and a pair of pivot-arms, mounted on opposite sides of the lens cone and having transversely aligned pivotal supporting means to permit swinging movement of the camera on an axis located within a predetermined distance from the center of gravity of the apparatus.

4. In aerial photographic apparatus, a camera having a lens cone, and a plurality of interchangeably usable lenses each having pre-adjusted means for causing the lens to assume automatically the position of focus when seated in the cone.

5. In aerial photographic apparatus, a camera having a lens cone provided with a lens-support, and a plurality of interchangeably usable lenses each provided with pre-adjusted means to cooperate with the support and cause the lens to assume automatically the position of focus when seated on said support.

6. In a photographic apparatus, a camera, and means for equipping the camera with any one of a plurality of lens cones adapted to be interchangeably mounted on the camera in a common fixed position with respect to the exposure plane, a plurality of lenses each mounted in predetermined fixed position in its respective cone, and the several cones having means for pivotally supporting the camera to permit the same to swing on axes in substantially the same predetermined position with respect to the center of gravity of the apparatus.

7. In aerial photographic apparatus, a camera, a lens cone removably and non-adjustably mounted thereon, and a lens removably and non-adjustably secured in the lens cone in position of focus.

8. A lens cone adapted to be removably and non-adjustably mounted on an aerial camera, and a lens fixedly mounted in the cone in pre-adjusted position of focus.

9. A lens cone adapted to be removably and non-adjustably mounted on an aerial camera, a lens support in fixed position in the cone, and a lens fixed in pre-adjusted position of focus in the support.

In testimony whereof I hereto affix my signature.

SHERMAN M. FAIRCHILD.